(12) United States Patent
Skärby

(10) Patent No.: US 10,306,605 B2
(45) Date of Patent: May 28, 2019

(54) ALLOCATION OF UPLINK CONTROL CHANNEL RESOURCES FROM MAPPED RESOURCE REGION

(71) Applicant: Telefonaktiebolaget L M Ericsson (publ), Stockholm (SE)

(72) Inventor: Christian Skärby, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 434 days.

(21) Appl. No.: 14/767,874

(22) PCT Filed: Feb. 15, 2013

(86) PCT No.: PCT/EP2013/053053
§ 371 (c)(1),
(2) Date: Aug. 13, 2015

(87) PCT Pub. No.: WO2014/124679
PCT Pub. Date: Aug. 21, 2014

(65) Prior Publication Data
US 2015/0373695 A1    Dec. 24, 2015

(51) Int. Cl.
*H04L 1/16*    (2006.01)
*H04L 1/18*    (2006.01)
(Continued)

(52) U.S. Cl.
CPC ....... *H04W 72/0413* (2013.01); *H04L 1/1861* (2013.01); *H04L 5/001* (2013.01);
(Continued)

(58) Field of Classification Search
CPC ... B60K 16/00; B60K 2016/006; B60L 8/006; F03D 15/00; F03D 9/10; F03G 7/08;
(Continued)

(56) References Cited

U.S. PATENT DOCUMENTS

2010/0232378 A1* 9/2010 Imamura ............... H04L 1/1854
370/329
2012/0300722 A1* 11/2012 Kim ...................... H04L 1/1861
370/329
(Continued)

FOREIGN PATENT DOCUMENTS

WO    WO 2011/041623 A1    4/2011

OTHER PUBLICATIONS

R1-083722; 3GPP TSG RAN WG1 Meeting #54bis Prague, Czech Republic, Sep. 29-Oct. 3, 2008.*
(Continued)

*Primary Examiner* — Jung H Park
(74) *Attorney, Agent, or Firm* — Sage Patent Group

(57) ABSTRACT

For controlling radio transmission in a cellular communication network, a node of the cellular communication network determines a mapping between control channel elements of a downlink control channel and resources of an uplink control channel. The node determines a group of the resources of the uplink control channel which are mapped to a subgroup of the control channel elements. From this group of the resources, the node allocates resources to be used for transmission of uplink control information from a user equipment. Using a radio resource control message, the node may indicate the allocated resources to the user equipment. The allocated resources may be used as a Channel Selection set for transmitting feedback related to a secondary component carrier.

21 Claims, 15 Drawing Sheets

(51) Int. Cl.
*H04L 5/00* (2006.01)
*H04W 72/04* (2009.01)

(52) U.S. Cl.
CPC .......... *H04L 5/0053* (2013.01); *H04L 5/0055* (2013.01); *H04L 5/0094* (2013.01); *H04L 1/1671* (2013.01); *H04L 1/1812* (2013.01)

(58) Field of Classification Search
CPC ........... F05B 2220/31; F05B 2240/941; Y02E 10/72; Y02T 10/90; H04L 1/18; H04L 5/001; H04L 5/0053; H04L 5/0055; H04L 5/0094
See application file for complete search history.

(56) References Cited

U.S. PATENT DOCUMENTS

2012/0320848 A1* 12/2012 Chen ..................... H04W 28/06
370/329
2013/0044653 A1* 2/2013 Yang ..................... H04L 1/1671
370/280
2013/0044722 A1* 2/2013 Kang .................... H04L 1/1861
370/329
2014/0003356 A1* 1/2014 Wang ..................... H04L 5/001
370/329

OTHER PUBLICATIONS

International Search Report, Application No. PCT/EP2013/053053, dated Nov. 8, 2013.
Written Opinion of the International Searching Authority, Application No. PCT/EP2013/053053, dated Nov. 8, 2013.
3GPP, Technical Specification, "3rd Generation Partnership Project; Technical Specification Group Radio Access Network; Evolved Universal Terrestrial Radio Access (E-UTRA); Physical layer procedures (Release 10)", 3GPP TS 36.213 V10.13.0 (Jun. 2015), 128 pp.
Nokia Siemens Networks et al., "PUCCH Resource Allocation for Repeated ACK/NACK", Agenda item: 6.3, Document for: Discussion and Decision, 3GPP TSG RAN WG1 Meeting #54bis, R1-083722, Prague, Czech Republic, Sep. 29-Oct. 3, 2008, 3 pp.

* cited by examiner

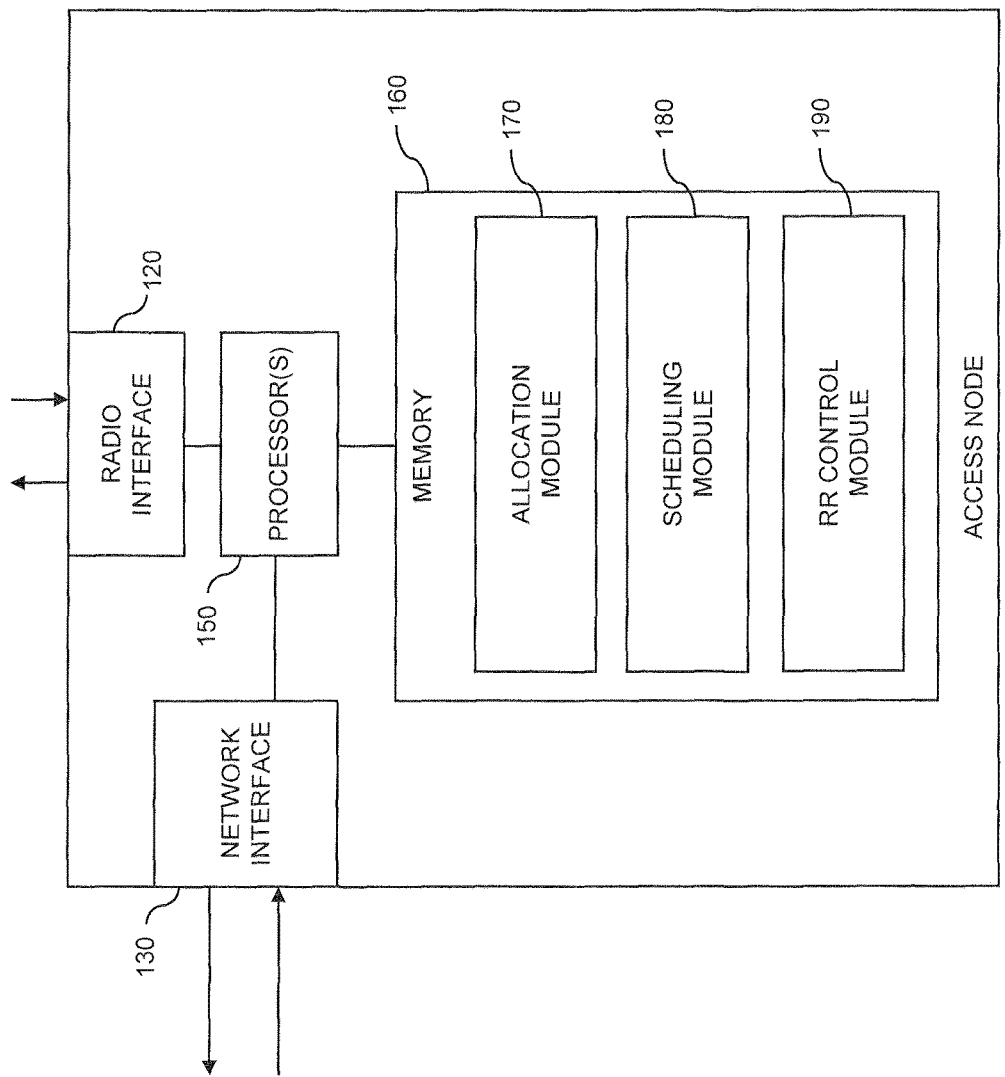

ALLOCATION OF UPLINK CONTROL CHANNEL RESOURCES FROM MAPPED RESOURCE REGION

CROSS REFERENCE TO RELATED APPLICATION

This application is a 35 U.S.C. § 371 national stage application of PCT International Application No. PCT/EP2013/053053, filed on Feb. 15, 2013, the disclosure and content of which is incorporated by reference herein in its entirety. The above-referenced PCT International Application was published in the English language as International Publication No. WO 2014/124679 A1 on Feb. 15, 2013.

TECHNICAL FIELD

The present invention relates to methods for controlling radio transmission in a cellular communication network and to corresponding devices.

BACKGROUND

In cellular communication networks, it is known to use control channels for conveying control information between the cellular communication network and a user equipment (UE) connected to the cellular communication network. For example, in the case of the Long Term Evolution (LTE) radio access technology specified by the $3^{rd}$ Generation Partnership Project a Physical Downlink Control Channel (PDCCH) is used for conveying downlink (DL) control information to the UE, and a Physical Uplink Control Channel (PUCCH) is used for conveying uplink (UL) control information from the UE to the cellular communication network. The LTE radio access technology uses Orthogonal Frequency Division Multiplexing (OFDM) in the DL direction and Discrete Fourier Transform Spread (DFTS) OFDM, also referred to as Single Carrier Frequency Division Multiple Access (SC FDMA) in the UL direction, using a resource grid which is divided into orthogonal subcarriers in the frequency domain. A resource element of the resource grid corresponds to one subcarrier in the frequency domain and the duration of one OFDM symbol in the time domain. In the time domain, the resources are further organized into radio frames of 10 ms duration and subframes of 1 ms duration. The resource elements may be allocated in units of resource blocks (RBs), one RB covering multiple subcarriers in the frequency domain and extending over multiple OFDMA symbols in the time domain. The allocation of RBs is often performed in pairs, referred to as RB pair.

One purpose of the PDCCH is transmission of scheduling assignments using Downlink Control Information (DCI) messages. Such DCI messages contain instructions for the UE on how to receive or transmit on the shared data channels, in the DL direction referred to as Physical DL Shared Channel (PDSCH) and in the UL direction referred to as Physical UL Shared Channel (PUSCH). Such DCI messages may for example include DL assignments indicating one or more RB pairs for DL transmission on the PDSCH, UL grants indicating one or more resource RB pairs for UL transmission on the PUSCH, a Modulation and Coding Scheme to be used for transmission, or the like, and such DCI messages may be sent on every scheduling occasion, i.e., in each subframe.

The PDCCH is transmitted in the first OFDM symbols of a subframe and may extend over up to three OFDM symbols, referred to as Control Region (CR). Resource elements inside this region are organized into logical groups referred to as Control Channel Elements (CCE).

The PUCCH allows for code multiplexing, which means that several UEs may transmit in the same RB pair of the PUCCH. In particular, one RB pair of the PUCCH may hold up to 36 PUCCH resources defined by the RB pair and a certain spreading code. The PUCCH may for example be used for conveying feedback messages of the Hybrid Automatic Repeat Request (HARQ) protocol used by the Medium Access Control (MAC) layer of LTE. For example, according to the LTE Release 8 specifications an acknowledgement (ACK) or a negative acknowledgement (NACK) in the form of a timed single bit indication on the PUCCH may be used to indicate which transport blocks on the PDSCH were successfully received by the UE.

According to 3GGP Technical Specification (TS) 36.213 V.10.8.0 (2012-12), an index of the first CCE used for a DL assignment is used as a pointer to the resource(s) of the PUCCH to be used by the UE for transmitting the HARQ feedback. Using this mapping, the PUCCH resources for transmitting the HARQ feedback can be efficiently selected, without requiring that an allocation is indicated to the UE. This feedback mechanism may also be referred to as CCE-mapped HARQ feedback.

However, such implicit selection of resources on the PUCCH is not applicable to certain types of UL control information transmitted by the UE. For example, when utilizing a concept referred to as carrier aggregation, there may also be a need for transmitting feedback messages for a secondary cell (SCell). Carrier aggregation allows to transmit data simultaneously on multiple component carriers which may be combined from different bands of the available radio spectrum. In this connection, a set of a primary DL component carrier and a primary UL component carrier used for initially establishing a Radio Resource Control (RRC) connection to a UE may be referred as a primary cell (PCell). Using carrier aggregation one or more additional DL component carriers and/or UL component carriers may be additionally configured for this UE, forming a secondary cell (SCell). For efficiently supporting asymmetric carrier aggregation constellations, e.g., using more DL component carriers than UL component carriers, the carrier aggregation concept involves sending all UL control information on the primary UL component carrier, irrespective of further UL component carriers being configured. Accordingly, for example HARQ feedback messages for the SCell(s) would need to be sent on the PUCCH of the primary UL component carrier. However using the same mapping mechanism as for the PCell for deriving the PUCCH resources on which the HARQ feedback is transmitted is not possible due to PUCCH collisions. For example, if one UE receives a DL assignment on the CCE of the PCell with index 0, this CCE could no longer be used for transmitting a DL assignment for an SCell configured for another UE, because the CCE index would point to the same resources of the PUCCH for transmitting the HARQ feedback.

According to the LTE release 8 specifications, the PUCCH format used to carry HARQ feedback, also referred to as Format 1b, conveys two information bits (ACK or NACK) by selecting one out of four constellation points of a Quadrature Phase Shift Keying (QPSK) symbol. This format may also be used in the case of carrier aggregation with only two configured DL component carriers. In this case, the UE thus needs to propagate two additional information bits on the PUCCH of the primary UL component carrier. This is accomplished by selecting one out of four possible PUCCH resources for transmitting the feedback.

Accordingly, two information bits are be conveyed by selecting one out of four constellation points of the transmitted QPSK symbol and two further information bits are conveyed by selecting one out of four possible PUCCH resources for transmission. Further details concerning the mapping of symbols and PUCCH resources can be found in the above-mentioned 3GPP TS 36.213. Accordingly, additional PUCCH resources of the primary UL carrier need to be allocated to the UE. These additional PUCCH resources may be configured in the UE through RRC procedures and are also referred to as Channel Selection (CS) set. The CS set may be allocated from a region of the PUCCH resources referred to as $N_{PUCCH}^{(1)}$ region, which is not mapped to the CCEs of the PDCCH, thereby avoiding interfering with the CCE-mapped HARQ feedback. However, this resource region is also used for other purposes, e.g., for transmission of scheduling requests from the UEs, so that usage of the CS mechanism adversely affects the available capacity for scheduling requests from the UEs.

Similar problems may arise in other scenarios where resources of an UL control channel are on the one hand assigned using a mapping to DL control channel resources, but also further resources of the UL channel need to be allocated for certain purposes.

Accordingly, there is a need for techniques which allow for efficiently using control channel resources.

SUMMARY

According to an embodiment of the invention, a method of controlling radio transmission in a cellular communication network is provided. According to the method, a node of the cellular communication network determines a mapping between control channel elements of a DL control channel and resources of an UL control channel. Further, the node determines a group of the resources of the UL control channel which are mapped to a subgroup of the control channel elements. From the group of the resources, the node allocates resources to be used for transmission of UL control information from a UE. Further the node indicates the allocated resources to the UE.

According to a further embodiment of the invention, a node for a cellular communication network is provided. The node comprises an interface to a UE and at least one processor. The at least one processor is configured to:
  determine a mapping between control channel elements of a DL control channel and resources of an UL control channel,
  determine a group of the resources of the UL control channel which are mapped to a subgroup of the control channel elements,
  from the group of the resources, allocate resources to be used for transmission of UL control information from a UE, and
  via the interface, indicate the allocated resources to the UE.

According to a further embodiment of the invention, a computer program product comprising program code to be executed by at least one processor of a node for controlling radio transmission in a cellular communication network is provided. Execution of the program code causes the node to:
  determine a mapping between control channel elements of a DL control channel of a and resources of an UL control channel,
  determine a group of the resources of the UL control channel which are mapped to a subgroup of the control channel elements,
  from the group of the resources, allocate resources to be used for transmission of UL control information from a UE, and
  indicate the allocated resources to the UE.

BRIEF DESCRIPTION OF THE DRAWINGS

FIG. 15 schematically illustrates a node according to an embodiment of the invention.

DETAILED DESCRIPTION OF EMBODIMENTS

In the following, concepts in accordance with exemplary embodiments of the invention will be explained in more detail and with reference to the accompanying drawings. The illustrated embodiments relate to concepts for control radio transmission in a cellular communication network using LTE radio access technology.

Figure 1:
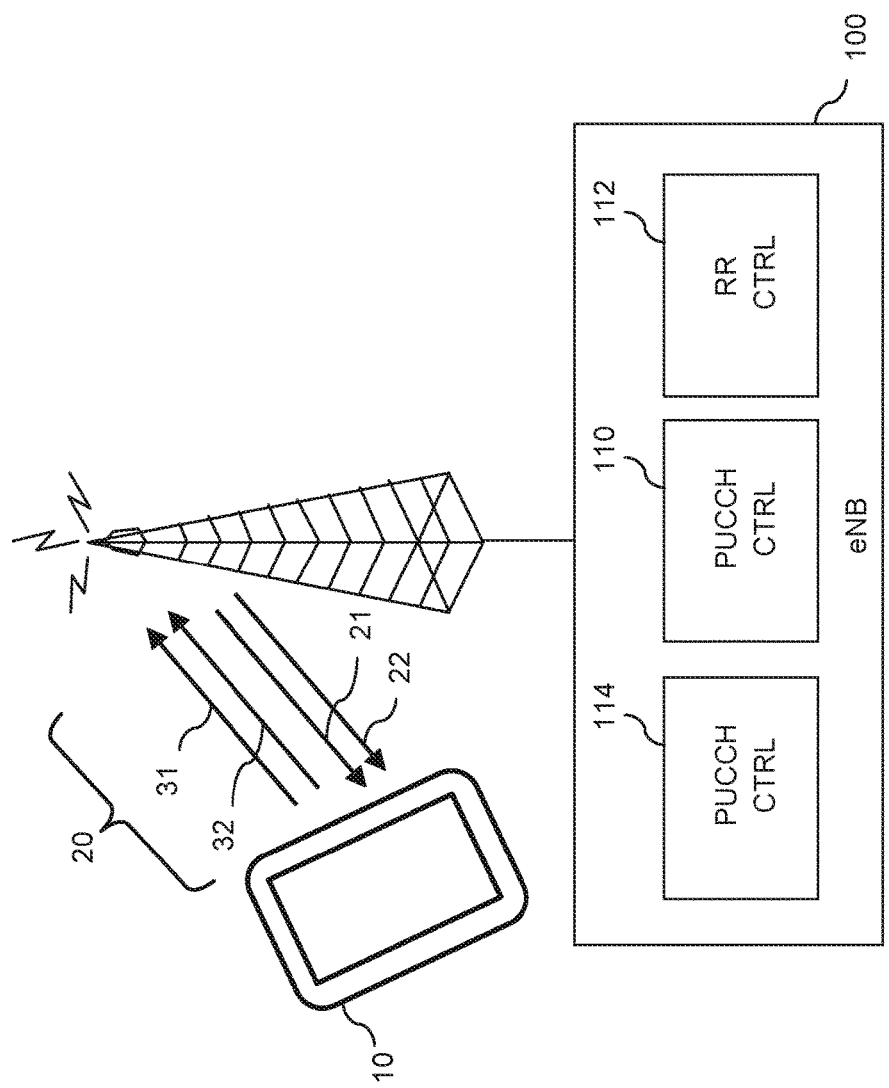
FIG. 1 shows a cellular communication network environment in which concepts according to an embodiment of the invention may be implemented.

FIG. 1 schematically illustrates a cellular communication network environment, i.e., infrastructure of a cellular communication network, represented by an access node 100, and a UE 10 for connecting to the cellular communication network. The UE 10 may be, e.g., a mobile phone, portable computer, or some other type of UE. As illustrated, the UE 10 communicates with the access node 100 via a radio link 20. In accordance with the illustrated 3GPP LTE scenario, the access node 100 may be an evolved Node B (eNB) and the radio link 20 may be established using the LTE Uu radio interface. The radio link 20 may carry data traffic in the DL direction from the access node 100 to the UE 10 and/or in the UL direction from the UE 10 to the access node 100.

As further illustrated, carrier aggregation may be used on the radio link 20. That is to say, a constellation of multiple DL component carriers 21, 22 may be used for transmitting user plane data from the access node 100 to the UE 10 and/or multiple UL component carriers 31, 32 may be used for transmitting user plane data from the UE 10 to the access node 100. The DL component carrier 21 is assumed to be the primary DL component carrier for the UE 10, and the DL component carrier 22 is assumed to be a secondary DL component carrier configured for the UE 10. Similarly, the UL component carrier 31 is assumed to be the primary UL component carrier for the UE 10, and the UL component carrier 32 is assumed to be a secondary UL component carrier configured for the UE 10. Other carrier aggregation constellations could be utilized as well, e.g., an asymmetric constellation using the DL component carriers 21, 22, but only the UL component carrier 31 or a constellation in which one or more further DL component carriers and/or one or more further UL component carriers are configured for the UE 10.

Further, also control information may be transmitted between the access node 100 and the UE 10. In particular, a DL control channel may be used for transmitted the DL control information, and an UL control channel may be used for transmitting the UL control channel. In accordance with the illustrated LTE scenario, it is assumed that each of the DL component carriers 21, 22 carries a PDCCH and that the primary UL component carrier carries a PUCCH. For implementing concepts of allocating PUCCH resources as further explained below, the access node 100 is provided with a PUCCH controller (PUCCH CTRL) 110. Further, the access node 100 is provided with a radio resource controller (RR CTRL) 112 for implementing RRC functionalities and with a DL user plane controller (DL UP CTRL) 114 for controlling user plane data transmissions to the UE 10, e.g., for performing scheduling of DL or UL transmissions. For a better overview, it was refrained from depicting other functionalities which may be provided in the access node 100.

Figure 2:
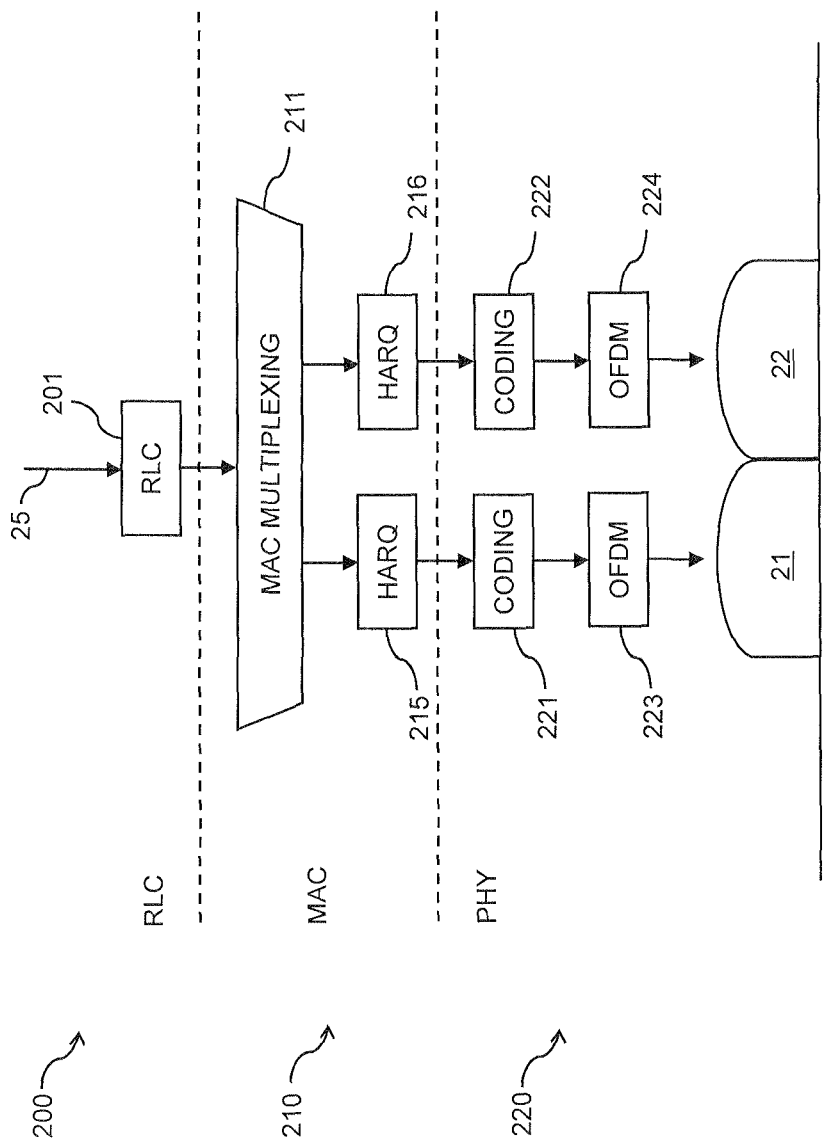
FIG. 2 illustrates data processing in a carrier aggregation scenario in accordance with an embodiment of the invention.

FIG. 2 illustrates a block diagram for illustrating an exemplary scenario of data processing in carrier aggregation according to the LTE release 10 specifications. In FIG. 2, a constellation of the DL component carriers 21, 22 is illustrated. It is to be understood that the constellation of DL component carriers 21, 22 as illustrated in FIG. 2 is merely an example and that the data processing of FIG. 2 may be applied in a corresponding manner to any other constellation of component carriers, adjacent as illustrated in FIG. 2 or non-adjacent, and that similar processing may also be performed in the UL direction.

As illustrated, multiplexing of a user plane data flow 25 to the different component carriers may be accomplished above the layer of the HARQ protocol. This implies that HARQ retransmissions are performed independently per DL component carrier 21, 22.

In the scenario of FIG. 2, the user plane data flow 25 is processed in different protocol layers, which are a Radio Link Control (RLC) layer 200, a MAC layer 210, and a physical (PHY) layer 220. In the RLC layer 200, an RLC entity 201 is provided for implementing RLC functionalities. In the MAC layer 210, a multiplexer 211 multiplexes the data flow 25 to a number of separate data streams, each of which corresponds to one of the DL component carriers 21, 22. Further, the MAC layer 210 provides a HARQ entity 215, 216 for each of the data streams. In the PHY layer 220, a separate coder 221, 222 is provided for each of the data streams. Further, the PHY layer 220 provides a separate OFDM block 223, 224 for each of the data streams. In this way, the multiple DL component carriers may be efficiently utilized for conveying user plane data to the UE 10.

Figure 3:
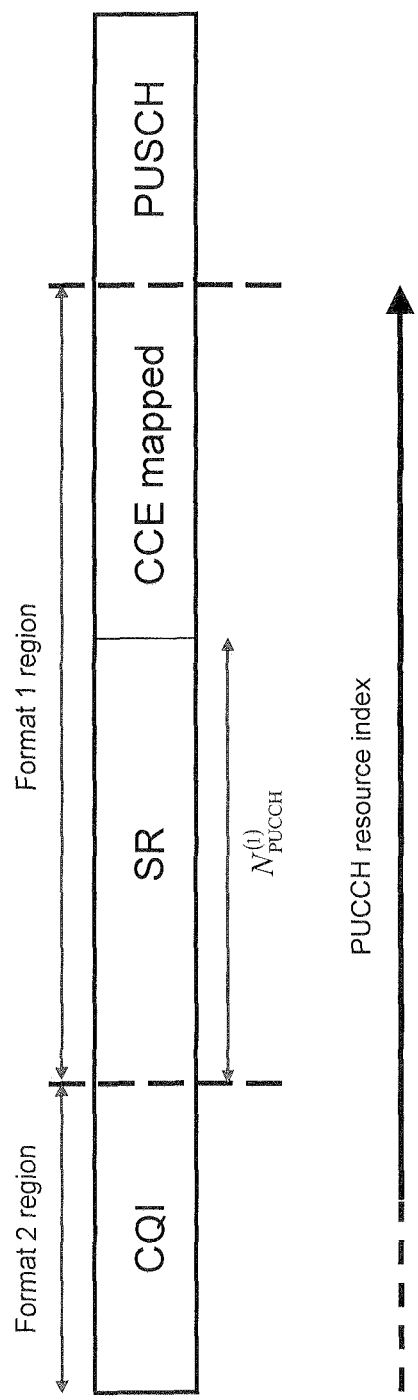
FIG. 3 illustrates resource regions of an UL control channel as utilized in an embodiment of the invention.

In accordance with the illustrated L TE scenario, it is assumed that a mapping is defined between CCEs of the PDCCHs on the DL component carriers 21, 22 and resources for transmission of HARQ feedback on the PUCCH carried by the primary UL component carrier 31. In accordance with 3GPP TS 36.213, this mapping may be defined by:

$$n_{PUCCH}^{(1,\tilde{p}_0)} = n_{CCE} + N_{PUCCH}^{(1)},$$

where $n_{PUCCH}^{(1,\tilde{p}_0)}$ is the index of the PUCCH resource, $\tilde{p}_0$ maps to antenna port $p_0$, $n_{CCE}$ is the index of the CCE used for transmission of a DL assignment and $N_{PUCCH}^{(1)}$ is a parameter configured in the UE 10 through RRC procedures. If multiple CCEs are used for transmitting the DL assignment, $n_{CCE}$ is the lowest index of these CCEs. The region of these mapped resources of the PUCCH and further resource regions of the PUCCH are illustrated in FIG. 3. As shown in FIG. 3, the further resource regions may for example include the $N_{PUCCH}^{(1)}$ region, which may be used for scheduling request (SR) transmission, and a Format 2 region which may be used for Channel Quality Indicator (CQI) transmission. The $N_{PUCCH}^{(1)}$ region and the CCE mapped resource region constitute the Format 1 region of the PUCCH.

The above mapping may be used for controlling implicit selection of PUCCH resources to be used for HARQ feedback concerning transmission of user plane data on the primary DL component carrier 21. For HARQ feedback concerning transmission of user plane data on the secondary DL component carrier 22 further PUCCH resources are allocated. As will be further explained below, also these resources are allocated from the CCE mapped resource region of the PUCCH, thereby saving other valuable PUCCH resources, e.g., in the $N_{PUCCH}^{(1)}$ region.

In order to avoid that the allocation from the CCE mapped region excessively blocks using such PUCCH resources for the mapping based implicit HARQ feedback resource selection and consequently also blocks usage of the mapped CCEs for sending DL assignments, the allocated PUCCH resources are selected from a group of the CCE mapped PUCCH resources which are mapped to a certain subgroup of the CCEs. This subgroup may be selected considering the likelihood of using the CCEs for sending DL assignments, thereby reducing the risk of blocking CCEs with high likelihood of being used for sending DL assignments. This will be further explained in the following by referring to certain restrictions on usage of the CCEs as applicable for the LTE radio access technology, however bearing in mind that restrictions concerning the selection of resources of a DL control channel typically also exist in other radio access technologies and that such restrictions will typically cause differing likelihoods of such DL control channel resources being used for sending DL control information.

In the illustrated LTE scenario, such different likelihoods of using CCEs of the PDCCH for example arise from restrictions imposed to facilitate blind decoding of the PDCCH by the These restrictions in particular include the following:

1. The UEs shall only attempt to decode CCEs which are contiguous in the CCE domain.
2. The UEs shall only evaluate groups of CCEs having a size of 1, 2, 4, or 8 CCEs. These sizes are also referred to as CCE aggregation levels.
3. The UEs shall only attempt to decode groups CCEs for which the index $n_{CCE}$ of the first CCE is zero or an integer multiple of the CCE aggregation level. This means that for CCE aggregation level 1 the index $n_{CCE}$ of the first evaluated CCE can be $n_{CCE}$=0, 1, 2, . . . , for CCE aggregation level 2 the index $n_{CCE}$ of the first evaluated CCE can be $n_{CCE}$=0, 2, 4, . . . , for CCE aggregation level 4 the index $n_{CCE}$ of the first evaluated CCE can be $n_{CCE}$=0, 4, 8, . . . , and for CCE aggregation level 8 the index $n_{CCE}$ of the first evaluated CCE can be $n_{CCE}$=0, 8, 16, . . . .

4. The UEs shall evaluate only a limited number of candidate groups of CCEs for each aggregation level. The limited set of candidate groups is also referred to as search space. The candidate groups of CCEs for one aggregation level are contiguous (with wrap around the edges of the CCE domain). The search space changes in a pseudorandom fashion every subframe in order to ensure that blocking of PDCCH resources due to UEs having overlapping search spaces does no become permanent.

Figure 4:
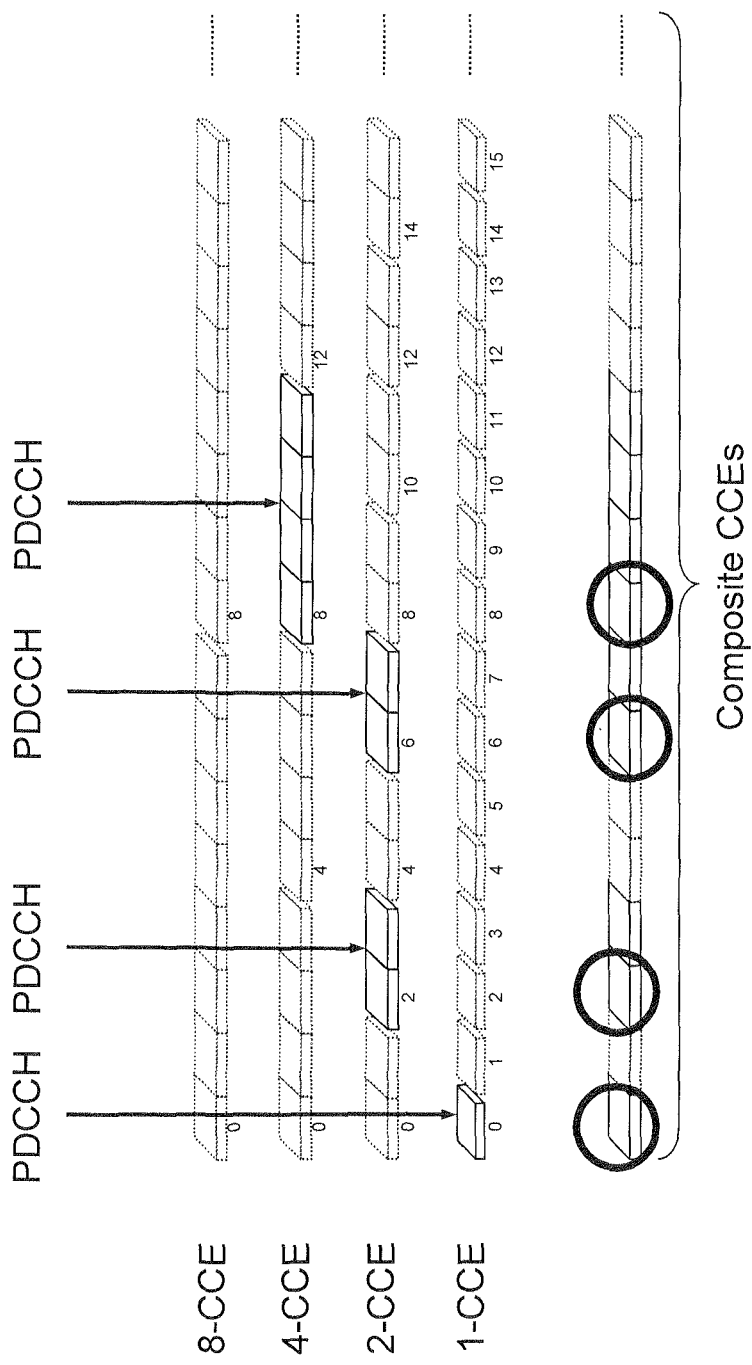
FIG. 4 illustrates CCE aggregation as utilized in an embodiment of the invention.

An exemplary usage of the different CCE aggregation levels is illustrated in FIG. 4. As shown in FIG. 4, DL assignments may be transmitted on the PDCCH in CCE with index 0 using CCE aggregation level 1, in CCEs with index 2,3 and 6,7 using CCE aggregation level 2, and in CCEs with index 8-11 using CCE aggregation level 4, resulting in a composite CCE configuration on the PDCCH as illustrated in the lower part of FIG. 4. The circles indicate the first CCEs of the DL assignments which are used for deriving the PUCCH resources for sending HARQ feedback using the mapping between CCEs and PUCCH resources.

As can be seen, due to the above restrictions certain PUCCH resources are less likely to be used for HARQ feedback. This may be utilized for efficiently determining the PUCCH resources which are additionally allocated to the UE 10, e.g., to be used as CS set. For example, as can be seen from the illustration of FIG. 4, the PUCCH resources mapped to CCEs with index 1, 3, 5, 7, . . . would not be used for sending HARQ feedback because they are not mapped to the first CCE used to send a DL assignment. This is a consequence of the above-mentioned restrictions concerning CCE usage. Accordingly, it is advantageous to select the subgroup of CCEs, to which the group of PUCCH resources for allocation is mapped, as the subgroup of CCEs with odd index.

Figure 5:
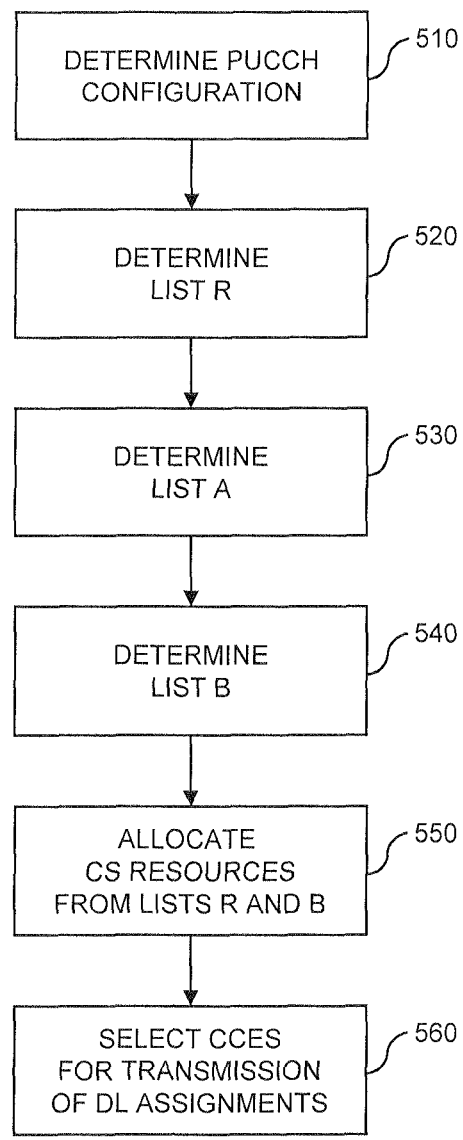
FIG. 5 shows a flowchart for illustrating a method according to an embodiment of the invention.

In addition to the above way of determining a group of PUCCH resources for allocating additional resources to the UE 10, it may also be beneficial to control the selection of CCEs for sending DL assignments in such a way that PUCCH resources are not unduly blocked by the mapping based assignment of PUCCH resources for HARQ feedback. Further, the additionally allocated PUCCH resources may be selected in such a way that there is no undue blocking of the mapped CCEs for sending DL assignments. In the following, a method for implementing the above considerations will be explained in connection with FIG. 5. In the method of FIG. 5, additional resources of the PUCCH are allocated to the UE 10 to be used as CS set. The method of FIG. 5 may for example be performed by the access node 100 as illustrated in FIG. 1.

At step 510, an overall PUCCH resource configuration is determined. This resource configuration may for example be similar to that as illustrated in FIG. 2. The determination of the PUCCH resource configuration may in particular include determining a PUCCH resource index corresponding to the start of the CCE mapped region and a PUCCH resource index corresponding to the end of the CCE mapped region. Further, resource indices may be determined which correspond to the start of the Format 2 region, to the end of the Format 2 region, to the start of the $N_{PUCCH}^{(1)}$ region, to the end of the $N_{PUCCH}^{(1)}$ region, to the start of the CCE mapped region, and/or to the end of the CCE mapped region.

At step 520, if there are resources left in the last resource block used of the PUCCH, i.e., in the resource block adjacent to the PUCCH, these resources are included into a list R. If these resources are not sufficient for allocation of the CS set, the remaining number of needed CS resources P may be set the total number of needed CS resources minus the number of resources in the list R.

At step 530, a list A of PUCCH resources in the CCE mapped region is generated. The PUCCH resources in the list a are determined in such a way that they fulfill the condition:

$$n_{PUCCH}^{(1,\tilde{p}_0)} - N_{PUCCH}^{(1)} + 1 \equiv 0 \pmod{2}. \quad (2)$$

Figure 6:
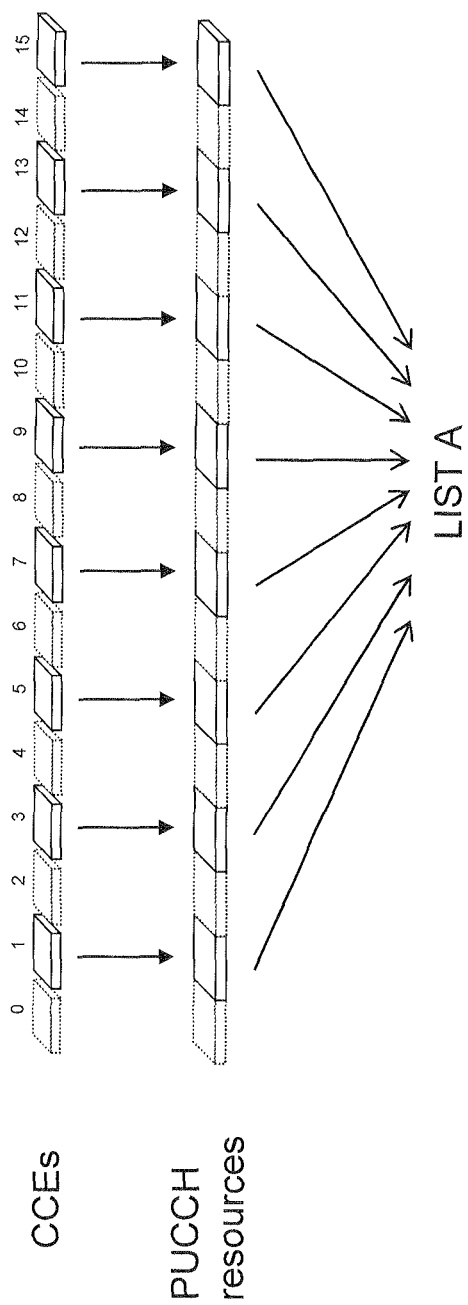
FIG. 6 illustrates a group of UL control channel resources as utilized in an embodiment of the invention.

That is to say, the list A is generated to include PUCCH resources of the CCE mapped region which, according to the mapping of (1), are mapped to CCEs with odd index. This is illustrated in FIG. 6.

As a result of step 530, the list A is obtained as a list of PUCCH resources which have a reduced likelihood of blocking CCEs from being available for sending DL assignments, because the PUCCH resources in the list A are mapped to CCEs which do not constitute the first CCE of a possible CCE group in aggregation levels 2, 4, and 8, and such blocking may only occur for aggregation level 1.

At step 540, a further list B is created. If the number $N_A$ of resources in the list A, is larger than the remaining number P of needed CS resources, the list B is created by selecting resources from the list A in such a way that CCEs to which the selected PUCCH resources are mapped are spread out, i.e., the spacing between these CCEs in terms of the CCE index is maximized. For example, if the elements in the list A are, in the order of increasing PUCCH resource index, identified by an index $i_A=0, \ldots, N_A$, the elements in the list B could be selected as those elements of the list A which fulfill:

$$i_A = p \cdot \left\lfloor \frac{N_A}{P} \right\rfloor, \text{ with } p = 0, \ldots, P. \quad (3)$$

Figure 7:
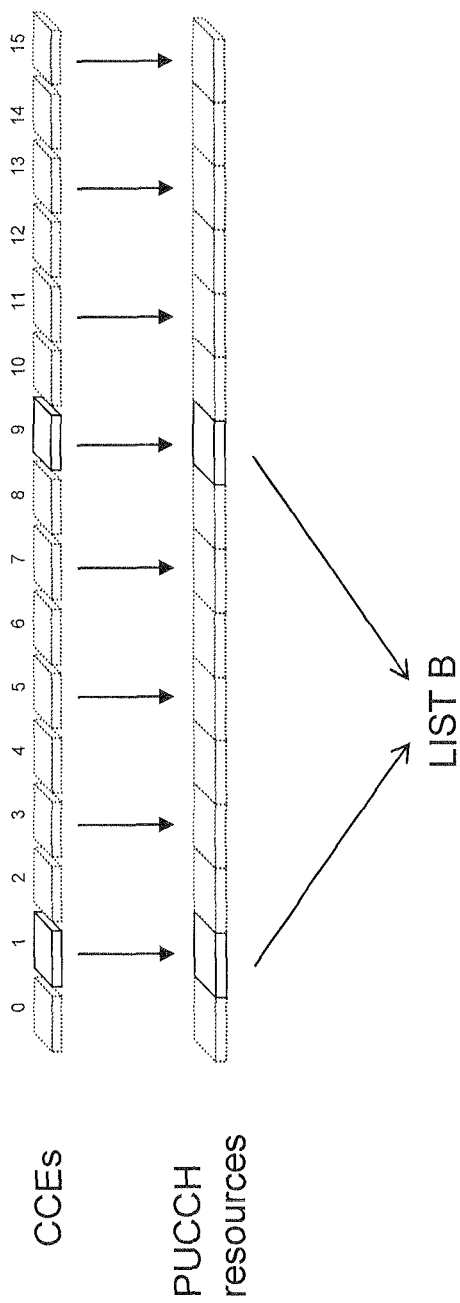
FIG. 7 illustrates a further selection of UL control channel resources as utilized in an embodiment of the invention.

An example of the list B for the case of $N_A=4P$ is illustrated in FIG. 7.

If the number $N_A$ is smaller than P, the list B is generated to be equal to the list A, and $P-N_A$ resources from the $N_{PUCCH}^{(1)}$ region are additionally included into the list R.

By the spreading of the CCEs mapped to the resources of the list B, the likelihood of blocking CCEs from being available for transmission of DL assignments is further reduced due to the above-mentioned contiguity of search spaces.

At step 550, a CS set is allocated to the UE 10 from the PUCCH resources in the lists R and B, and the allocated CS set is indicated to the UE 10 during SCell configuration. In the allocation of PUCCH resources for the CS set, the PUCCH resources may first be selected from the list R. In this way, the probability of blocking CCEs from being available for sending DL assignments is still further reduced because such potentially blocking PUCCH resources are only selected if no other PUCCH resources are available.

If sufficient PUCCH resources are not available in the list R, the PUCCH resources may be selected from the list B. This may be accomplished in an order which spreads out the CCEs mapped to the selected PUCCH resources. Due to the above-mentioned contiguity of the search spaces, this spreading still further reduces the likelihood of blocking CCEs from being available for transmission of DL assignments. For example, the PUCCH resources in the list B may be selected in the following order of an index $i_B$:

$$i_B = 0, \left\lfloor \frac{P}{2} \right\rfloor, \left\lfloor \frac{P}{4} \right\rfloor, \left\lfloor \frac{3P}{4} \right\rfloor, \left\lfloor \frac{P}{8} \right\rfloor, \left\lfloor \frac{3P}{8} \right\rfloor, \left\lfloor \frac{5P}{8} \right\rfloor, \left\lfloor \frac{7P}{8} \right\rfloor, \left\lfloor \frac{P}{16} \right\rfloor, \ldots \quad (4)$$

where $i_B=0, \ldots, P$ is an index identifying the elements in the list B.

At step 560, when selecting CCEs for sending DL assignments in the PCell and SCell, CCE groups in which the first CCE maps to a PUCCH resource in the list B may be disregarded if there are other candidate CCE groups of the wanted aggregation level in the search space. Candidate CCE groups in which the first CCE does not map to a PUCCH resource in the list B which but include another CCE mapped to a PUCCH resource in the list B may be preferred over CCE groups which do not fulfill this criterion. By this selection of CCEs which are mapped to PUCCH resources in the list B, the problem of CCE blocking can be further reduced by actively selecting CCEs which have a reduced likelihood of becoming blocked by a potential CS set allocation from the list B.

For example, if it is assumed that the list B includes only PUCCH resources mapped to CCE with index 1 and a DL assignment using CCE aggregation level 2 needs to be allocated, the choice for allocating the DL assignment is between using CCEs with index 2 and 3 or using CCEs with index 0 and 1. However, the allocation of CCEs with index 2 and 3 blocks more CCEs, because then the following allocations no longer will be possible: a CCE aggregation level 1 allocation using the CCE with index 2, a CCE aggregation level 1 allocation using the CCE with index 3, a CCE aggregation level 2 allocation using the CCEs with index 2 and 3, a CCE aggregation level 4 allocation using the CCEs with index 0, 1, 2, and 3, and a CCE aggregation level 8 allocation using the CCEs with index 0, 1, 2, 3, 4, 5, 6, and 7. Accordingly five allocation possibilities are blocked. As compared to that the choice of allocating the CCEs with index 0 and 1 only blocks four allocation possibilities, namely a CCE aggregation level 1 allocation using the CCE with index , a CCE aggregation level 2 allocation using the CCEs with index 0 and 1, a CCE aggregation level 4 allocation using the CCEs with index 0, 1, 2, and 3, and a CCE aggregation level 8 allocation using the CCEs with index 0, 1, 2, 3, 4, 5, 6, and 7. The reason for this that the blocking effect of the list B and the blocking effect of the allocation for the DL assignment overlap.

Steps 510, 520, 530, and 540 may be performed per cell when the cell is configured and may be repeated if the cell configuration changes. Step 550 may be performed in relation to the specific UE 10 when the SCell is configured for this UE 10. Step 560 may performed as a part of per subframe scheduling for the UE 10.

Figure 8:
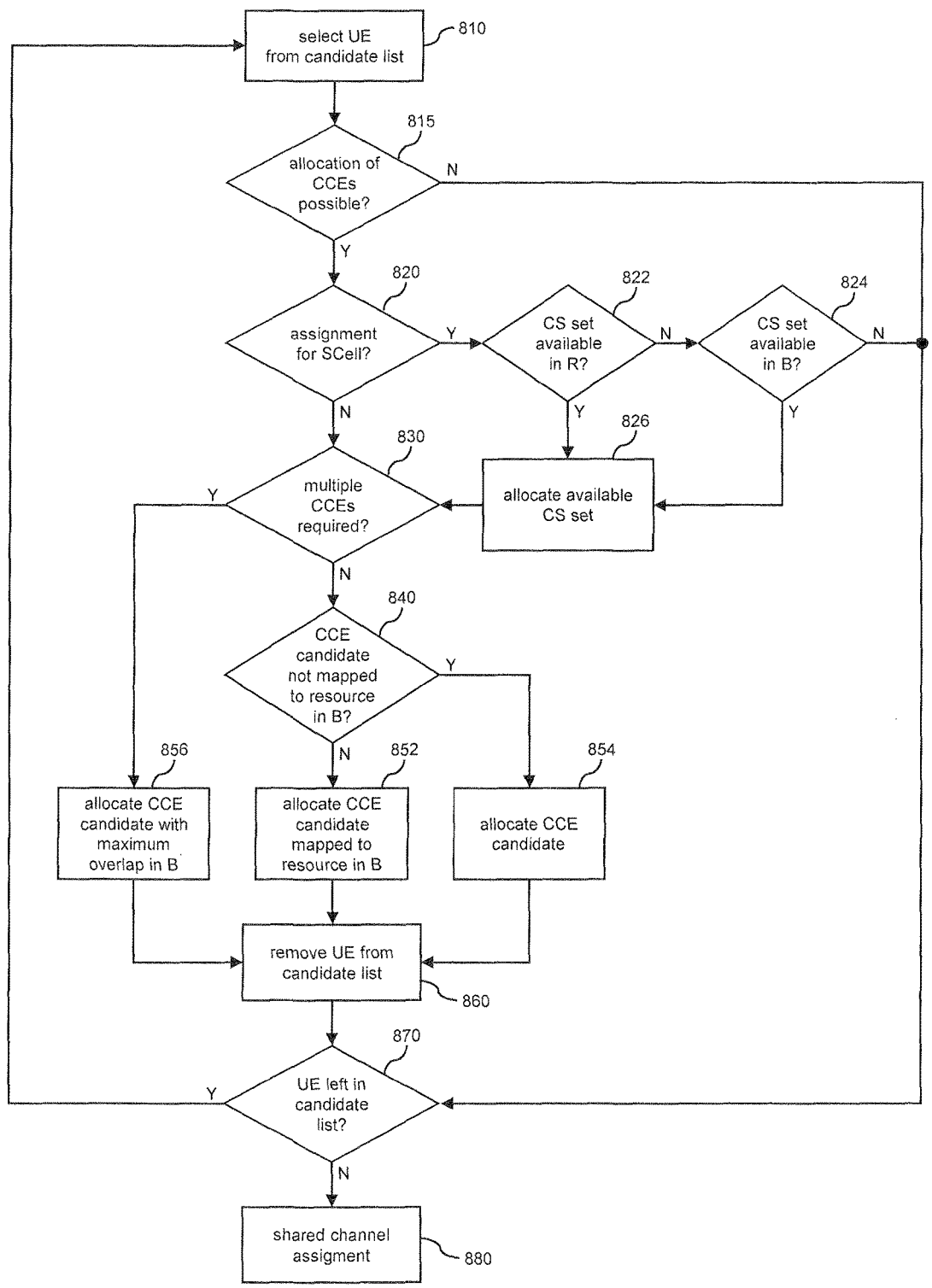
FIG. 8 illustrates a method of CCE allocation to an embodiment of the invention.

FIG. 8 shows a flowchart for illustrating a method which may be performed by the access node 100 for efficiently allocating CCEs to be used for sending DL assignments to UEs. The DL assignments indicate resources on the PDSCH to be used for sending DL user plane data. The method is on principles as explained in connection with step 560 of FIG. 5. In this method, it is assumed that UEs requiring allocation of CCEs are arranged in a candidate list, and that the allocation of CCEs is controlled according to weights assigned to the UEs.

At step 810, the UE with the highest weight is selected from the candidate list, and at step 815, it is determined whether it is possible to allocate one or more CCEs for sending at least one DL assignment to the UE. The determination of step 815 may for example be based on the availability of CCEs on the PDCCH. For example, no CCEs may be available because they were already be assigned to other UEs. As mentioned above, the CCEs could also be unavailable due to being blocked by allocation of the corresponding PUCCH resources. If it is possible to allocate one or more CCEs to the UE, the method proceeds with step 820, as indicated by branch "Y". If it is not possible to allocate one or more CCEs for sending the at least one DL assignment to the UE, the method proceeds with step 870, as indicated by branch "N".

At step 820, it is checked whether the at least one DL assignment to be transmitted is an SCell assignment. If the at least one DL assignment is not an SCell assignment, but rather a PCell assignment, the method proceeds with step 830, as indicated by branch "N".

As mentioned above, if the at least one DL assignment is an SCell assignment also a CS set is needed for transmitting the HARQ feedback from the UE. Accordingly, if the check of step 820 reveals that the at least one DL assignment is an SCell assignment, the method proceeds with step 822, where it is determined whether PUCCH resources for the CS set are available in the list R. If this is not the case, the method continues with step 824, as indicated by branch "N". If PUCCH resources for the CS set are available in the list R, the method continues with step 826, as indicated by branch "Y", where the CS set is allocated to the UE using the available PUCCH resources from the list R. At step 824, it is determined whether PUCCH resources for the CS set are available in the list B. If this is the case, the method continues with step 826, as indicated by branch "Y", where the CS set is allocated to the UE using the available PUCCH resources from the list B. If no PUCCH resources for the CS set are available in the list R, the method continues with step 870, as indicated by branch "N".

At step 830, it is checked if a plurality of CCEs is needed for the DL assignment, e.g., due to using a CCE aggregation level of 2, 4, or 8. If this is not the case, i.e., only one CCE is needed, the method continues with step 840, as indicated by branch "N". If a plurality of CCEs is needed, the method continues with step 856, as indicated by branch "Y".

At step 840, it is checked whether there are any CCE candidates which are not mapped to a PUCCH resource in the list B. If such CCE candidates are available, the method proceeds with step 854, as indicated by branch "Y". If no such CCE candidate is available, the method proceeds with step 852, as indicated by branch "N". At step 852, a CCE candidate mapped to a PUCCH resource in the list B is allocated for sending the DL assignment to the UE. At step 854, a CCE candidate not mapped to a PUCCH resource in the list B is allocated for sending the DL assignment to the UE.

At step 856, the CCE group mapped to PUCCH resources having maximum overlap to the PUCCH resources on the list B is allocated for sending the DL assignment to the UE.

After allocation of one or more CCEs at step 852, 854, or 856, the method proceeds to step 860, where the UE is removed from the candidate list and continues with step 870. At step 870, it is checked whether there are any further UEs requiring allocation of one or more CCEs for sending a DL assignment in the candidate list. If this is the case, the method returns to step 810. Otherwise, the method may proceed with step 880, where the resources to be assigned on the PDSCH are determined.

Figure 9:
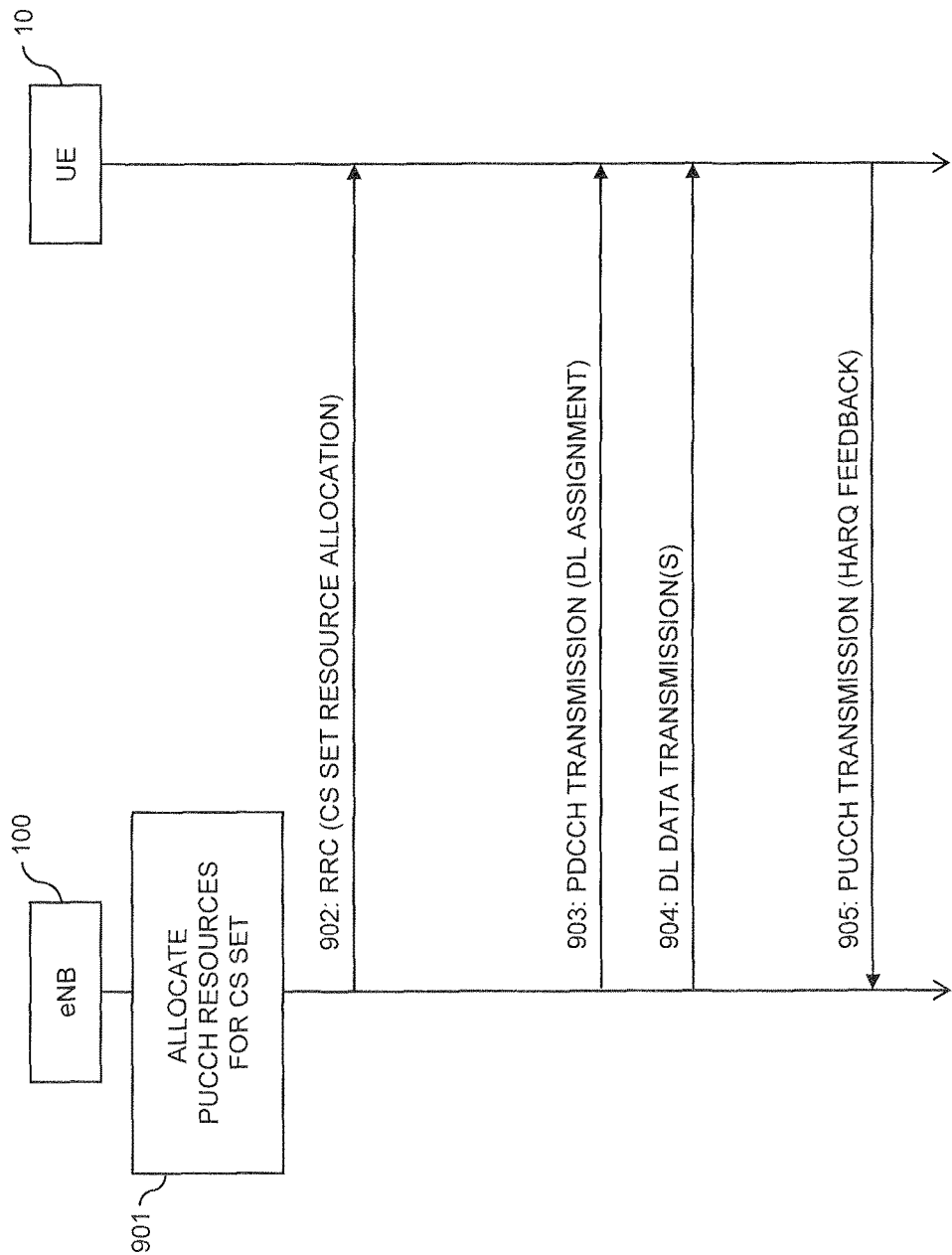
FIG. 9 illustrates exemplary procedures according to an embodiment of the invention.

FIG. 9 shows a signaling diagram for further illustrating an procedures according to exemplary usage of allocated PUCCH resources for transmission of HARQ feedback using the CS mechanism. The procedures of FIG. 9 involve the access node 100 and the UE 10.

At step 901, the access node 100 allocates PUCCH resources for a CS set to the UE 10. These PUCCH resources are selected from the CCE mapped region using the above-mentioned principles.

By message 902, the access node 100 indicates the allocated resources to the UE 10. Message 902 may be a RRC message. The allocated PUCCH resources may be explicitly indicated in message 902, e.g., in terms of the PUCCH resource index. The allocation of step 901 and the sending of message 902 may for example be accomplished when configuring an SCell with the secondary DL component carrier 22 for the UE 10.

By PDCCH transmission 903, the access node 100 sends one or more DL assignments to the access node UE 10. The DL assignments indicate PDSCH resources in which one or more DL user plane data transmissions 904 to the UE 10 are scheduled. The sending of the DL assignments is accomplished in one or more CCEs of the PDCCH. These CCEs may be selected in accordance with the principles explained in connection with step 560 of FIG. 5 or FIG. 8. It is assumed that the DL user plane data transmissions 904 are scheduled on the secondary DL component carrier 22 configured for the UE 10. Accordingly, also the DL assignments 903 may be transmitted on the PDDCH of the secondary DL component carrier 22.

The access node 100 then sends the DL user plane data transmission(s) 904 to the UE 10, using the PDSCH resources as indicated by the DL assignment(s) in the PDCCH transmission 903.

The UE 10 then sends HARQ feedback 905 for the DL data transmission(s) 904 to the access node 100, thereby positively (ACK) or negatively (NACK) acknowledging receipt of the DL user plane data transmission(s) 904.

For sending the HARQ feedback 905, the UE 10 uses the PUCCH resources of the CS set as indicated in message 902. Irrespective of the DL user plane data transmission(s) taking place on the secondary DL component carrier 22, the corresponding HARQ feedback is sent on the primary UL component carrier 31.

Figure 10:
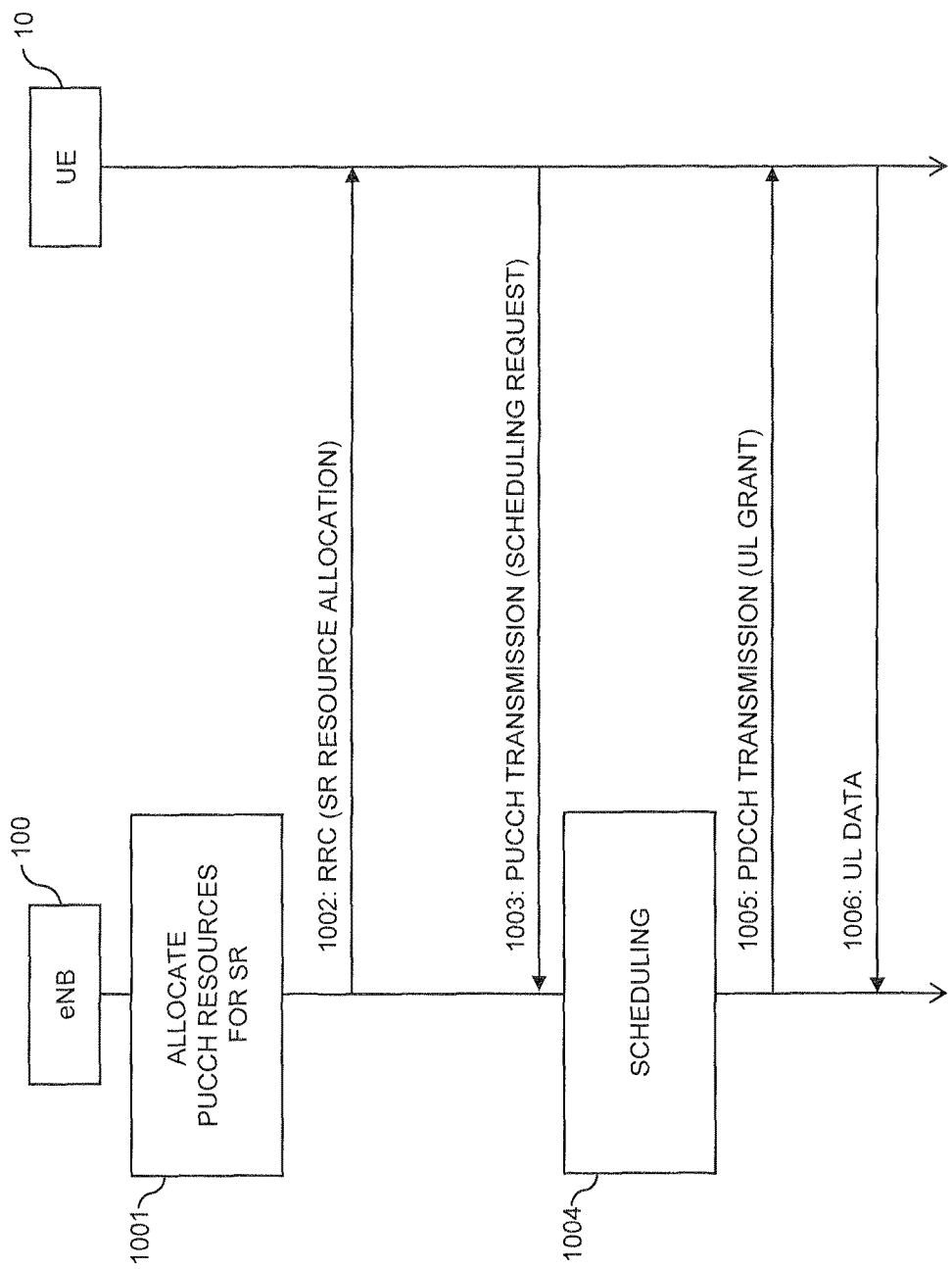
FIG. 10 illustrates further exemplary procedures according to an embodiment of the invention.

FIG. 10 shows a signaling diagram for further illustrating an procedures according to exemplary usage of allocated PUCCH resources for transmission of scheduling requests. The procedures of FIG. 10 involve the access node 100 and the UE 10.

At step 1001, the access node 100 allocates PUCCH resources for sending scheduling requests to the UE 10. These PUCCH resources are selected from the CCE mapped region using the above-mentioned principles.

By message 1002, the access node 100 indicates the allocated resources to the UE 10. Message 1002 may be a RRC message. The allocated PUCCH resources may be explicitly indicated in message 1002, e.g., in terms of the PUCCH resource index. The allocation of step 1001 and the sending of message 1002 may for example be accomplished when the UE 10 attaches to the cell controlled by the access node 100.

By PUCCH transmission 1003, the UE 10 sends a scheduling request to the access node 100. The scheduling request indicates to the access node 100 that the UE 10 needs to transmit UL user plane data and thus requires allocation of PUSCH resources. The scheduling request is sent in the PUCCH resources indicated by message 1002.

At step 1004, the access node 100 performs scheduling of the PUSCH resources. Using PDCCH transmission 1005, the access node 100 then sends one or more UL grants to the UE 10. The UL grant(s) indicate the scheduled PUSCH resources allocated to the UE 10.

The UE 10 may then send UL user plane data transmission(s) 1006 to the UE 10, using the PUSCH resources as indicated by the UL grant(s) in the PDCCH transmission 1004.

Figure 11:
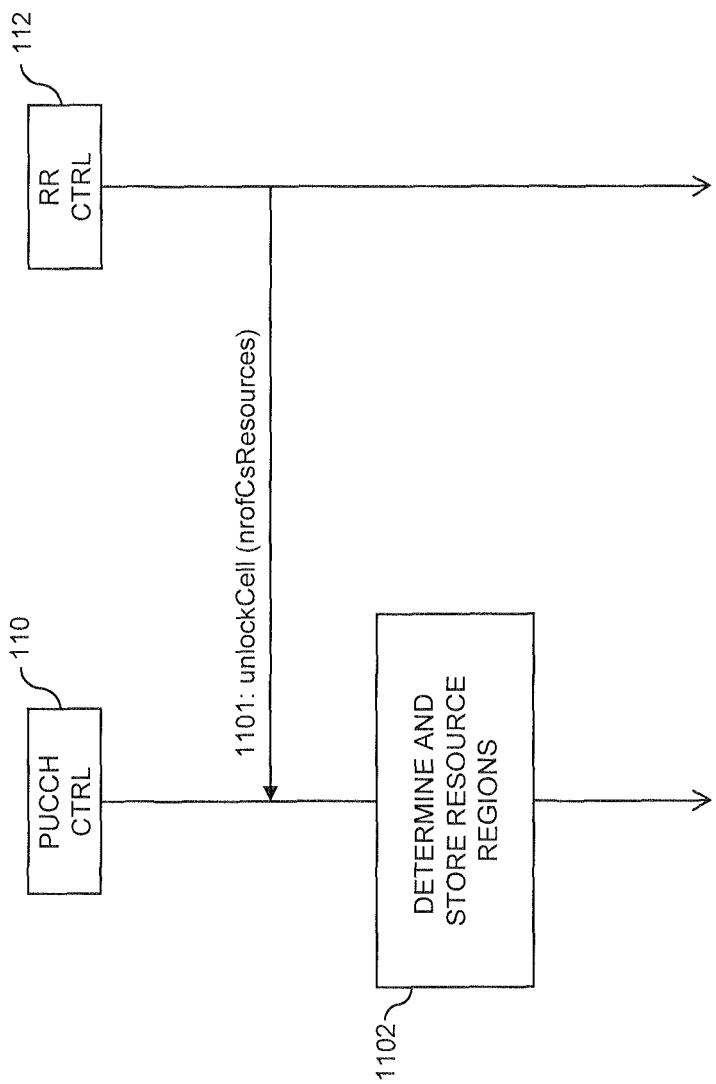
FIG. 11 illustrates further exemplary procedures according to an embodiment of the invention.

FIG. 11 shows a signaling diagram for illustrating exemplary procedures for configuring a cell controlled by the access node 100. The procedures of FIG. 11 involve the PUCCH CTRL 110 and the RR CTRL 112 implemented by the access node 100.

In the procedures of FIG. 11, the RR CTRL 112 unlocks the cell, e.g., in the course of RRC procedures, and indicates this unlocking of the cell to the PUCCH CTRL 110 by sending message 1101 to the PUCCH CTRL 110. Message 1101 may for example inform the PUCCH CTRL 110 about the number of PUCCH resources needed for allocation. Such PUCCH resources may then for example be allocated to be used for CS mechanisms or for other purposes, e.g., transmission of scheduling requests.

At step 1102, the PUCCH CTRL 110 then determines a corresponding PUCCH configuration. For this purpose, the PUCCH may for example determine and store the PUCCH regions for CQI transmission, scheduling request transmission, and CS. The latter regions may at least in part be located in the CCE mapped region. Using the above-mentioned principles, the PUCCH CTRL 110 may determine these at least in part as a group of PUCCH resources which are mapped to a certain subgroup of CCEs of the PDCCH.

Figure 12:
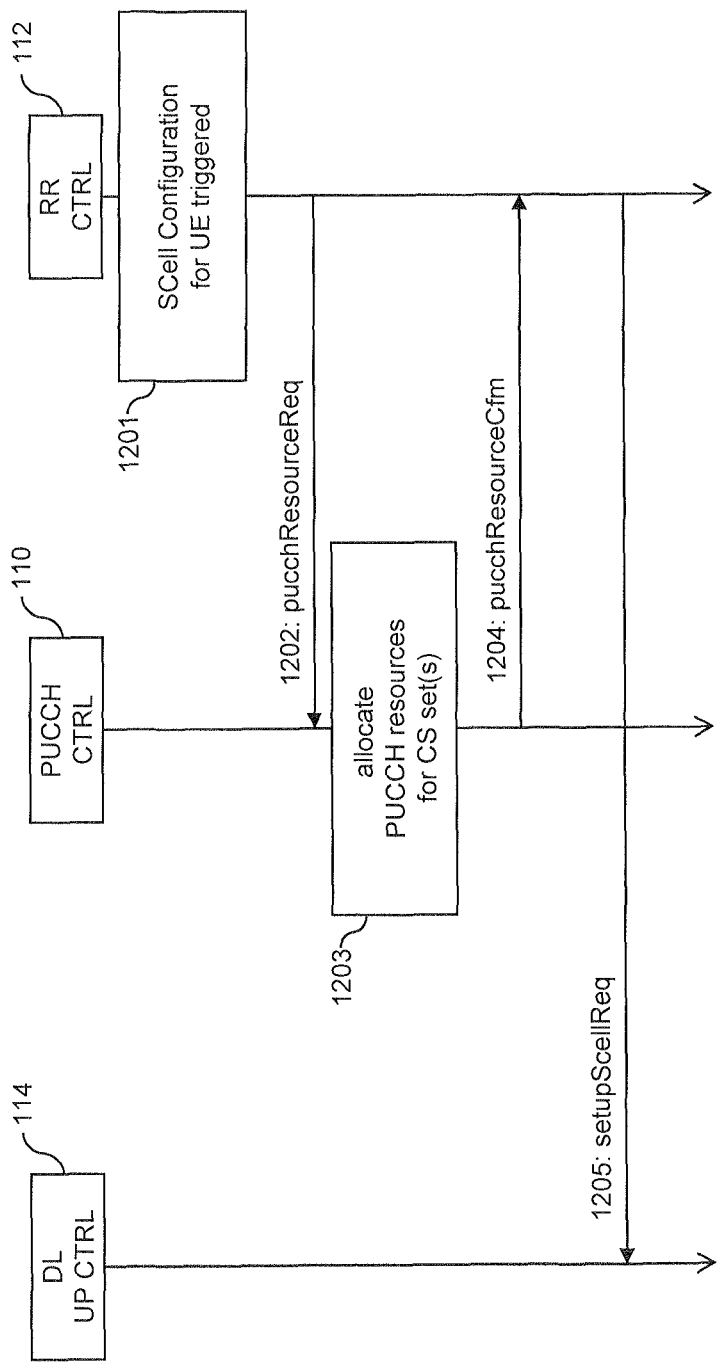
FIG. 12 illustrates further exemplary procedures according to an embodiment of the invention.

FIG. 12 shows a signaling diagram for illustrating exemplary procedures for configuring an SCell for a UE, e.g., the UE 10. The procedures of FIG. 12 involve the PUCCH CTRL 110, RR CTRL 112, and the DL UP CTRL 114 implemented by the access node 100.

At step 1201, the RR CTRL 112 detects that configuration of an SCell was triggered for the UE.

The RR CTRL 112 then proceeds by requesting allocation of CS resources by the PUCCH CTRL 110. This is accomplished by sending message 1202 to the PUCCH CTRL 110.

The PUCCH CTRL 110 then proceeds with step 1203 by allocating PUCCH resources for one or more candidate CS sets. The PUCCH CTRL 110 confirms the allocation of the PUCCH resources by sending message 1204 to the RR CTRL 112. Message 1204 also indicates the allocated PUCCH resources of the candidate CS sets, e.g., in terms of the PUCCH resource index.

The RR CTRL 112 then proceeds by sending message 1205 to the DL UP CTRL 114 for requesting the DL UP CTRL to setup the SCell. Message 1205 also indicates the allocated PUCCH resources of the candidate CS sets, e.g., in terms of the PUCCH resource index. When scheduling a DL user plane data transmission, the DL UP CTRL 112 may then select which candidate CS set to use and indicate this selection to the UE in the DL assignment. As compared to that, the PUCCH resource indices of the allocated candidate CS sets may be indicated to the UE in an RRC message (as for example explained in connection with FIG. 9).

Figure 13:
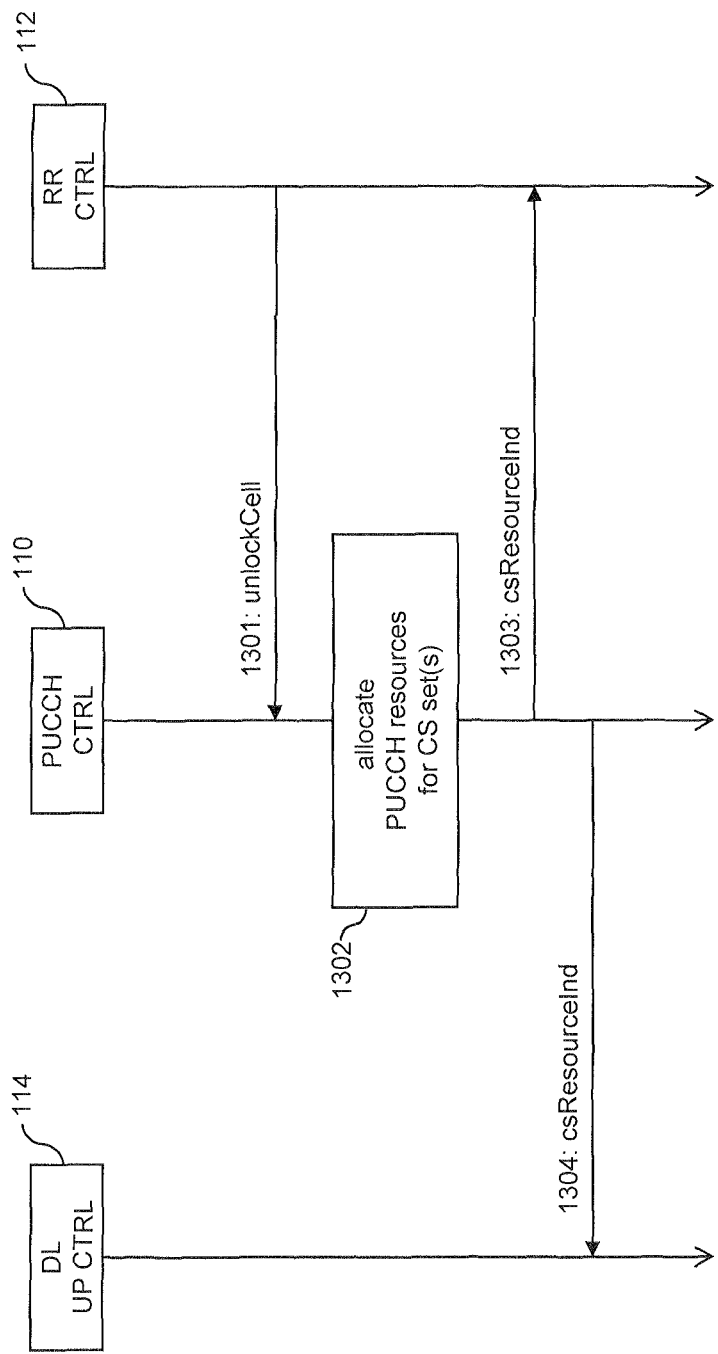
FIG. 13 illustrates further exemplary procedures according to an embodiment of the invention.

FIG. 13 shows a signaling diagram for illustrating exemplary procedures for allocating the same CS resources to all UEs in the cell controlled by the access node 100. The procedures of FIG. 12 involve the PUCCH CTRL 110, RR CTRL 112, and the DL UP CTRL 114 implemented by the access node 100.

In the procedures of FIG. 13, the RR CTRL 112 unlocks the cell, e.g., in the course of RRC procedures, and indicates this unlocking of the cell to the PUCCH CTRL 110 by sending message 1301 to the PUCCH CTRL 110. Message 1301 may for example inform the PUCCH CTRL 110 about the number of needed CS resources.

The PUCCH CTRL 110 then proceeds with step 1302 by allocating the PUCCH resources for one or more candidate CS sets. By message 1303, the PUCCH CTRL 110 indicates the allocated PUCCH resources of the candidate CS sets to the RR CTRL 112. By message 1303, the PUCCH CTRL 110 indicates the allocated PUCCH resources of the candidate CS sets to the DL UP CTRL 114.

In the procedures of FIG. 13, no dedicated configuration of PUCCH resources is required when configuring an SCell for one of the UEs.

Figure 14:
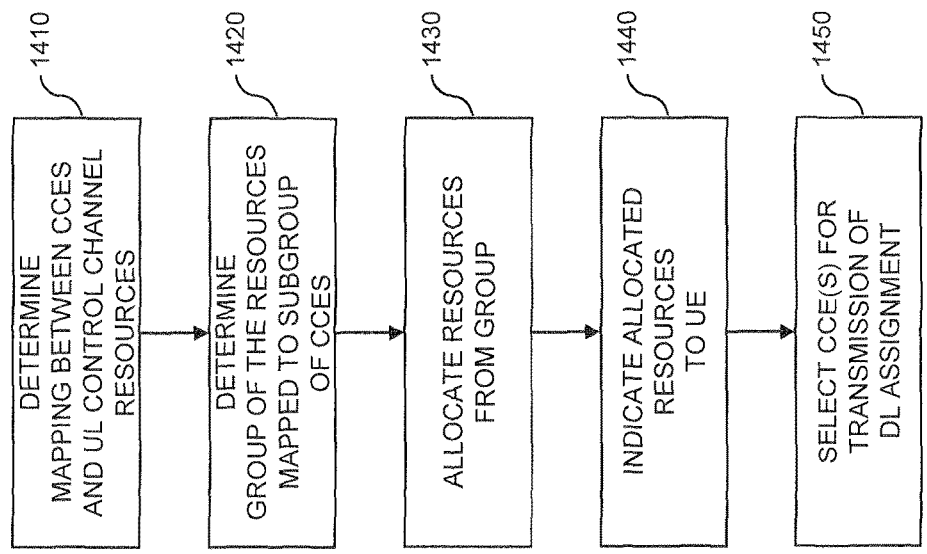
FIG. 14 shows a flowchart for illustrating a method according to an embodiment of the invention.

FIG. 14 shows a flowchart for illustrating a method for controlling radio transmission in a cellular communication network. The method may be implemented in a node of the cellular communication network, e.g., in an access node controlling a cells of the cellular communication network, such as the access node 100. If the radio transmission is based on LTE radio access technology, the node may correspond to an eNB.

At step 1410, the node determines a mapping between CCEs of a DL control channel and resources of an UL control channel. The mapping may be based on information which is statically configured in the node, e.g., in accordance with a communication standard.

As mentioned above, the mapping may have the purpose of deriving resources of the UL control channel to be used for feedback messages for positively or negatively acknowledging receipt of DL transmissions by a UE. In this case, the node may send sending one or more DL assignments in one or more of the CCEs of the DL control channel. According to the mapping between the CCEs of the DL control channel and the resources of the UL control channel. The node may determine one or more resources of the UL control channel for receiving the feedback messages from the UE. The feedback messages may positively or negatively acknowledge receipt of DL transmissions corresponding to the DL assignment(s).

If the radio transmission is based on LTE radio access technology, each of the CCEs of the DL control channel may be identified by a corresponding index $n_{CCE}=0, 1, 2, \ldots, n$, with n denoting the number of CCEs. The corresponding resources of the group may then be mapped to the CCEs with odd index $n_{CCE}$. The mapping is then defined by $n_{PUCCH}^{(1,\tilde{p}_0)}=n_{CCE}+N_{PUCCH}^{(1)}$, with $n_{PUCCH}^{(1,\tilde{p}_0)}$ denoting an index for identifying the resources of the uplink control channel and $N_{PUCCH}^{(1)}$ denoting a configurable integer. The parameter $N_{PUCCH}^{(1)}$ may for example be configured on a cell level, using RRC procedures.

At step 1420, the node determines a group of the resources of the UL control channel which are mapped to a subgroup of the CCEs of the DL control channel. The subgroup of the CCEs may for example be defined on the basis of a likehood of the CCEs to be used for certain purposes, such as transmission of DL assignments.

At step 1430, the node allocates resources from the group to a UE to be used for sending UL control information from the UE. The UL control information may for example include one or more feedback messages for positively or negatively acknowledging receipt of one or more DL transmissions of user plane data to the UE. The UL control information may also include one or more scheduling requests from the UE.

The node may also select resources from the group in such a way that a spacing of the CCEs to which the selected resources are mapped is maximized and perform the allocation of resources from the selected resources. In the case of the above-mentioned LTE scenario, this may be accomplished by selecting the resources from the group in such a way that the selected resources are manned to CCEs with index $$n_{CCE} = 2p \cdot \left\lfloor \frac{N_A}{P} \right\rfloor + 1,$$

with $N_A$ denoting the number of resources in the group; P denoting the number of resources required for said allocation of resources, and p=0, 1, . . . P. As explained in connection with step 540 of FIG. 5 for the group of resources defined by the list B, the group may thus be determined by spreading out the mapped CCEs. Also the actually allocated resources may be selected so as to spread out the mapped CCEs.

In some scenarios, the node may determine a further group of available resources which are not mapped to the CCEs of the DL control channel, e.g., as with the group of PUCCH resources in the list R. If the number of resources in the group is smaller than the number of resources required for the allocation, the node may performing the allocation from the group of mapped resources and from the further group of resources.

At step 1440, the node indicates the allocated resources to the UE, e.g., in an RRC message.

The cellular communication network may support aggregation of multiple DL component carriers for performing transmission between the cellular communication network and the UE, e.g., as explained in connection with FIGS. 1 and 2. In this case, the DL control channel may be transmitted on a primary DL component carrier and/or on a secondary DL component carrier, e.g., the DL component carrier 21 or 22, and the UL control information may relate to the secondary DL component carrier, e.g., the DL component carrier 22. In particular, the UL control information may include one or more feedback messages for positively or negatively acknowledging receipt of transmissions on the secondary DL component carrier, e.g., as explained in the exemplary procedures of FIG. 9.

In some scenarios, as illustrated by step 1450, the node may select one or more of the CCEs of the DL control channel which are not mapped to a resource of the group determined at step 1420. The node may then send one or more DL assignments in these selected CCEs, e.g., as explained in connection with step 560 of FIG. 5 and FIG. 8.

FIG. 15 illustrates exemplary structures which may be used for implementing the above concepts in a node of the cellular communications network, in particular in an eNB such as the access node 100.

As illustrated, the node includes a first interface 120. The first interface 120 may for example be a radio interface for connecting to one or more UEs. Alternatively, the first interface 120 could be some other type of interface for connecting to a remote radio unit. Further, the node may also be provided with a second interface 130. The second interface may for example be configured for communication with other nodes of the network, e.g., for establishing a backhaul connection.

Further, the node includes one or more processors 150 coupled to the interfaces 120, 130, and a memory 160 coupled to the processor(s) 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor(s) 150 so as to implement the above-described functionalities of the node. In particular, the memory 160 may include a allocation module 170 for implementing the above-described functionalities for allocation of UL control channel resources. For example, the allocation module 170 may be used for implementing the above-mentioned PUCCH controller 110. Further, the memory 160 may also include a scheduling module 180, e.g., for implementing the above-mentioned functionalities of generating DL assignments and selecting CCEs to be used for sending the DL assignments. For example, the scheduling module 180 may be used for implementing functionalities of the above-mentioned DL UP CTRL 114. Still further, the memory may include a RRC module for implementing the above-mentioned RRC functionalities. For example, the RRC module 190 may be used for implementing the above-mentioned RR CTRL 112.

It is to be understood that the structures as illustrated in FIG. 15 are merely schematic and that the node may actually include further components which, for the sake of clarity, have not been illustrated, e.g., further interfaces. Also, it is to be understood that the memory 160 may include further types of program code modules, which have not been illustrated, e.g., program code modules for implementing known functionalities of an eNB. According to some embodiments, also a computer program product may be provided for implementing functionalities of the node, e.g., in the form of a medium storing the program code and/or other data to be stored in the memory 160.

As can be seen, the concepts as described above may be used for providing efficient resource utilization on an UL control channel, but also on a DL control channel to which resources of the UL control channel are mapped. In the case of 3GPP LTE carrier aggregation, this may be used for efficiently allocation PUCCH resources for a CS set.

It is to be understood that the examples and embodiments as explained above are merely illustrative and susceptible to various modifications. For example, the allocated UL control channel resources may be utilized in various ways, e.g., by using allocated PUCCH resources not as CS set but for other ways of sending HARQ feedback. Further, the CCEs may correspond to logical groups of resources of the DL control channel as in the above-mentioned LTE example or may correspond to other types of allocation units, e.g., individual physical resources or groups thereof. Moreover, it is to be understood that the above concepts may be implemented by using correspondingly designed software to be executed by one or more processors of an existing device, or by using dedicated device hardware.

The invention claimed is:

1. A method of controlling radio transmission in a cellular communication network that supports aggregation of multiple downlink component carriers for performing transmission between the cellular communication network and a user equipment, the method comprising:
   a node of the cellular communication network determining a mapping between control channel elements of a downlink control channel and resources of an uplink control channel, wherein the downlink control channel is transmitted on one of: a primary downlink component carrier and a secondary downlink component carrier;
   the node determining a group of the resources of the uplink control channel which are mapped to a subgroup of the control channel elements, wherein the subgroup is selected based on a likelihood of using the control channel elements in the subgroup for sending downlink assignments;
   the node allocating, from the group of the resources, resources to be used for transmission of uplink control information relating to the secondary downlink component carrier from the user equipment; and
   the node indicating the allocated resources to the user equipment.

2. The method according to claim 1,
wherein the radio transmission is based on Long Term Evolution radio access technology;
wherein each of the control channel elements of the downlink control channel is identified by a corresponding index $n_{CCE}=0, 1, \ldots, n$; and
wherein the determined resources of the group are mapped to control channel elements with odd index $n_{CCE}$.

3. The method according to claim 2,
wherein the mapping is defined by $$n_{PUCCH}^{(1,\tilde{P}_0)} = n_{CCE} + N_{PUCCH}^{(1)},$$

with $n_{PUCCH}^{1,\tilde{P}_0}$ denoting an index for identifying the resources of the uplink control channel where $\tilde{P}_0$ maps to antenna port $P_0$ and $N_{PUCCH}^{(1)}$ denotes a configurable integer.

4. The method according to claim 1,
wherein the uplink control information comprises one or more feedback messages for positively or negatively acknowledging receipt of transmissions on the secondary downlink component carrier.

5. The method according to claim 1,
wherein the uplink control information comprises one or more scheduling requests from the user equipment.

6. The method according to claim 1, comprising:
the node selecting resources from the group to provide maximum spacing of the control channel elements to which the selected resources are mapped; and
the node performing said allocation of resources from the selected resources.

7. The method according to claim 1, comprising:
the node determining a further group of available resources which are not mapped to the control channel elements of the downlink control channel; and
responsive to the number of resources in the group being smaller than the number of resources required for said allocation, the node performing said allocation from the group of resources and from the further group of resources.

8. The method according to claim 1, comprising:
the node selecting one or more of the control channel elements of the downlink control channel which are not mapped to a resource of the group; and
the node sending one or more downlink assignments in the selected one or more of the control channel elements.

9. The method according to claim 1,
wherein said indicating of the allocated resources is performed in a radio resource control message.

10. The method according to claim 1, comprising:
the node sending one or more downlink assignments in one or more of the control channel elements of the downlink control channel; and
according to the mapping between the control channel elements of the downlink control channel and the resources of the uplink control channel, the node determining one or more resources of the uplink control channel for receiving one or more feedback messages from the user equipment, said feedback messages positively or negatively acknowledging receipt of transmissions corresponding to said one or more downlink assignments.

11. A node for controlling radio transmission in a cellular communication network that supports aggregation of multiple downlink component carriers for performing transmission between the cellular communication network and a user equipment, the node comprising an interface to a user equipment and at least one processor,
wherein the at least one processor is configured to:
determine a mapping between control channel elements of a downlink control channel and resources of an uplink control channel, wherein the downlink control channel is transmitted on one of: a primary downlink component carrier and a secondary downlink component carrier;
determine a group of the resources of the uplink control channel which are mapped to a subgroup of the control channel elements, wherein the subgroup is selected based on a likelihood of using the control channel elements in the subgroup for sending downlink assignments;
from the group of the resources, allocate resources to be used for transmission of uplink control information relating to the secondary downlink component carrier from the user equipment; and
via the interface, indicate the allocated resources to the user equipment.

12. The node according to claim 11,
wherein the radio transmission is based on Long Term Evolution radio access technology;
wherein each of the control channel elements of the downlink control channel is identified by a corresponding index $n_{CCE}=0, 1, \ldots, n$; and
wherein the determined resources of the group are mapped to control channel elements with odd index $n_{CCE}$.

13. The node according to claim 12,
wherein the mapping is defined by $$n_{PUCCH}^{(1,\tilde{p}_0)} = n_{CCE} + N_{PUCCH}^{(1)},$$

with $n_{PUCCH}^{(1,\tilde{p}_0)}$ denoting an index for identifying the resources of the uplink control channel where $\tilde{p}_0$ maps to antenna port $P_0$ and $N_{PUCCH}^{(1)}$ denotes a configurable integer.

14. The node according to claim 11,
wherein the uplink control information comprises one or more feedback messages for positively or negatively acknowledging receipt of transmissions on the secondary downlink component carrier.

15. The node according to claim 11,
wherein the uplink control information comprises one or more scheduling requests from the user equipment.

16. The node according to claim 11,
wherein the at least one processor is further configured to:
select resources from the group to provide maximum spacing of the control channel elements to which the selected resources are mapped; and
perform said allocation of resources from the selected resources.

17. The node according to claim 11,
wherein the at least one processor is further configured to:
determine a further group of available resources which are not mapped to the control channel elements of the downlink control channel, and
responsive to the number of resources in the group being smaller than the number of resources required for said allocation, perform said allocation from the group of resources and from the further group of resources.

18. The node according to claim 11,
wherein the at least one processor is further configured to:
select one or more of the control channel elements of the downlink control channel which are not mapped to a resource of the group, and
send one or more downlink assignments in the selected one or more of the control channel elements.

19. The node according to claim 11,
wherein the at least one processor is configured to perform said indicating of the allocated resources in a radio resource control message.

20. The node according to claim 11:
wherein the at least one processor is further configured to:
send one or more downlink assignments in one or more of the control channel elements of the downlink control channel,
according to the mapping between the control channel elements of the downlink control channel and the resources of the uplink control channel, determine one or more resources of the uplink control channel for receiving one or more feedback messages from the user equipment, said feedback messages positively or negatively acknowledging receipt of transmissions corresponding to said one or more downlink assignments.

21. A computer program product comprising a non-transitory computer readable storage medium storing program code to be executed by at least one processor of a node for controlling radio transmission between a cellular communication network and a user equipment, wherein the cellular communication network supports aggregation of multiple downlink component carriers for performing transmission between the cellular communication network and a user equipment, wherein execution of the program code causes the node to:
determine a mapping between control channel elements of a downlink control channel and resources of an uplink control channel, wherein the downlink control channel is transmitted on one of: a primary downlink component carrier and a secondary downlink component carrier,
determine a group of the resources of the uplink control channel which are mapped to a subgroup of the control channel elements, wherein the subgroup is selected based on a likelihood of using the control channel elements in the subgroup for sending downlink assignments;
allocate, from the group of the resources, resources to be used for transmission of uplink control information relating to the secondary downlink component carrier from the user equipment; and
indicate the allocated resources to the user equipment.

* * * * *